June 11, 1963    D. S. SILVER    3,093,721
APPARATUS FOR HEATING LIQUID, POWDERED OR GRANULAR MATERIAL
Filed Sept. 26, 1961    3 Sheets-Sheet 3
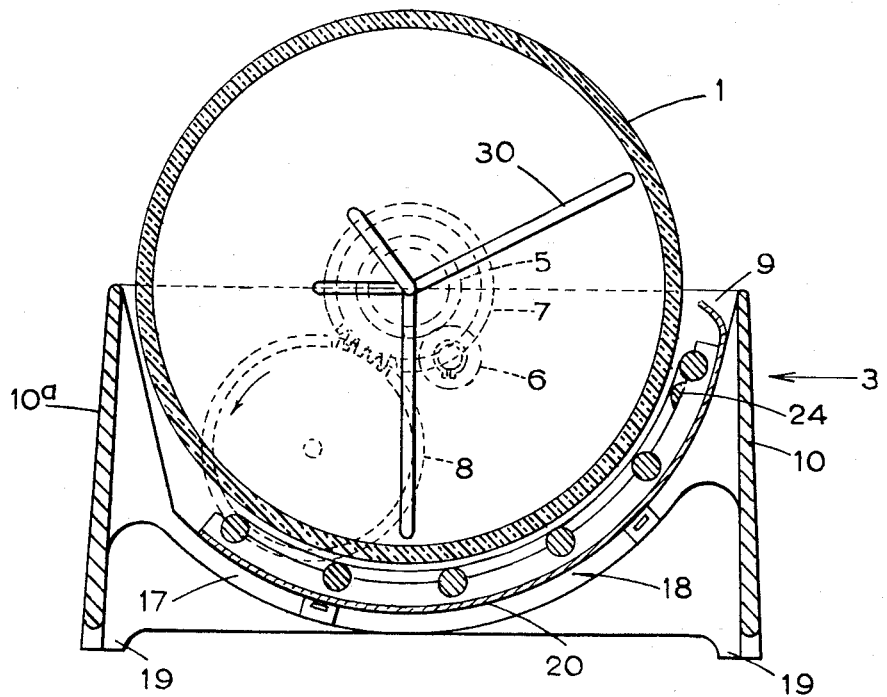
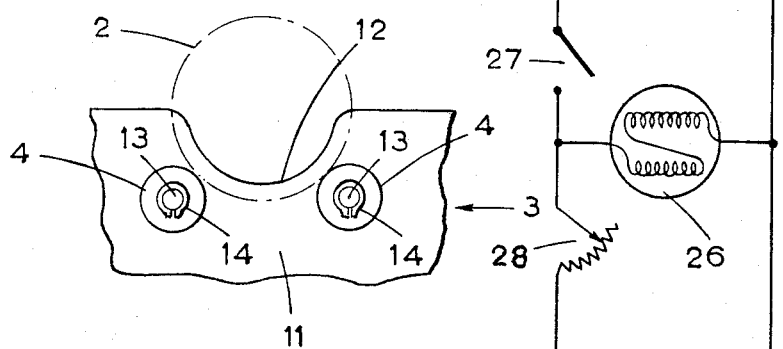
INVENTOR.
Dennis Stanley Silver
BY
Attorney 3,093,721
APPARATUS FOR HEATING LIQUID, POWDERED OR GRANULAR MATERIAL
Dennis Stanley Silver, London, England, assignor to Farrow & Jackson Limited, London, England
Filed Sept. 26, 1961, Ser. No. 140,711
Claims priority, application Great Britain May 11, 1961
8 Claims. (Cl. 219—19)

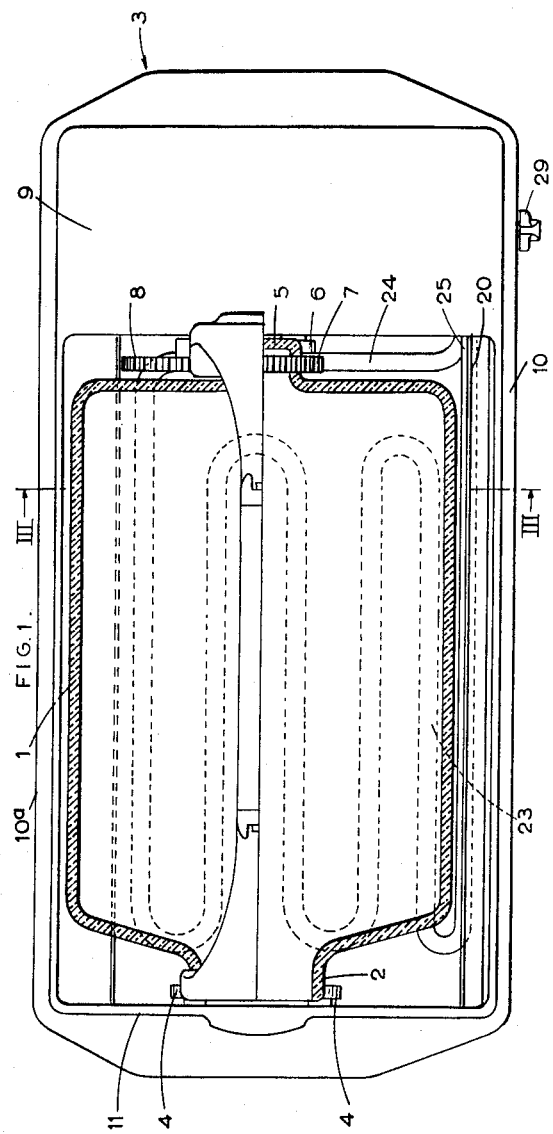

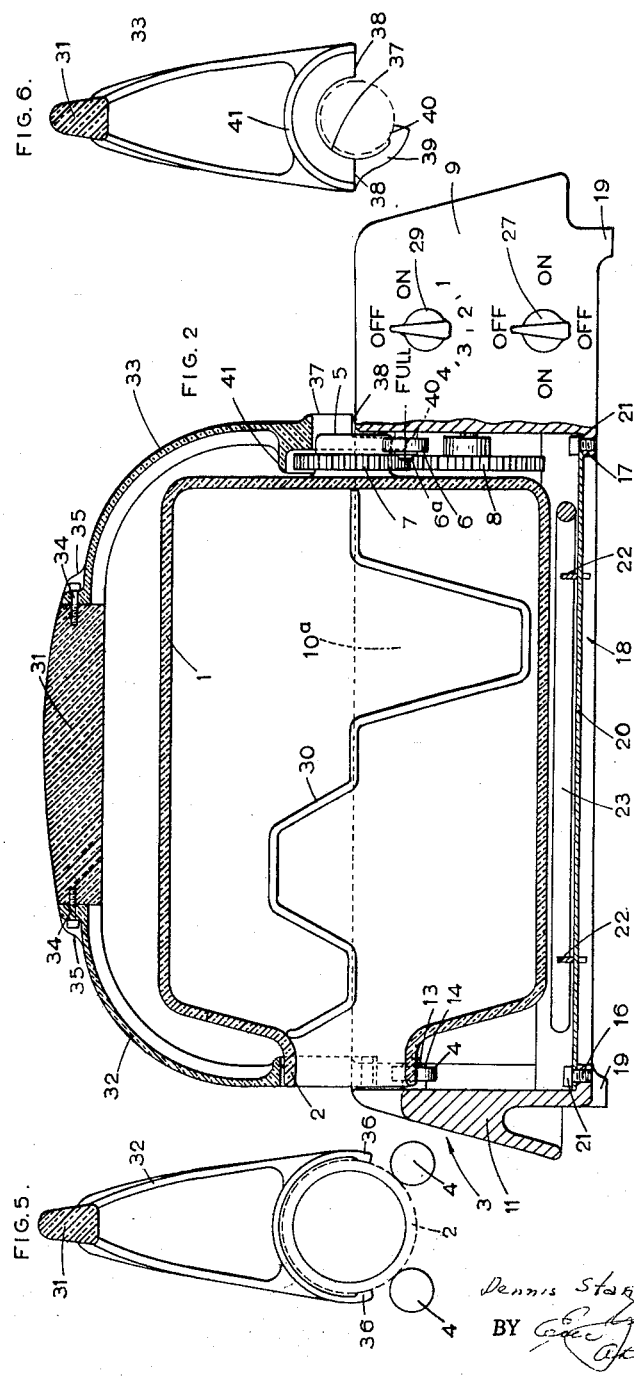

This invention relates to apparatus for heating liquid, powdered or granular material and is particularly concerned with apparatus for roasting coffee beans. The invention is very well suited to apparatus for roasting fairly small quantities, say one pound weight, of coffee beans at a time.

According to the invention, apparatus for heating liquid, powdered or granular material includes a transparent bottle open substantially coaxially at one end, means for supporting the bottle with its axis horizontal or nearly horizontal, and for rotating the bottle about that axis, the bottle being readily removable from the said means, means, relatively to which the bottle rotates, for heating the peripheral wall of the bottle, and a stirring device inside the bottle which stirs the liquid, powdered or granular material by virtue of the rotation of the bottle. Preferably the bottle is made of heat resisting glass and is circular in cross-section. The bottle may be arranged to rest on rollers and to be rotated by a rotary member, such as a spur gear, which meshes with a ring of gear teeth carried by the bottle. Very conveniently the bottle may have an open neck at one end and a protuberance at the other end, two rollers being provided to support the neck, and a third roller and the gear being arranged to support the protuberance. The heating unit may consist of an electrical heating element of the kind used in an electric cooker or an element that produces more heat in the form of infra-red rays than a cooker element.

The bottle is preferably provided with a heat insulating handle, relatively to which the bottle can rotate, for applying the bottle to and removing it from the means for supporting and rotating the bottle.

In order that the invention may be clearly understood and readily carried into effect, one construction in accordance therewith will now be described, by way of example, with reference to the accompanying drawings, in which:

FIGURE 1 is a sectional plan of a coffee roaster;
FIGURE 2 is a sectional side elevation of the roaster of FIGURE 1;
FIGURE 3 is a section on the line III—III in FIGURE 1, certain portions being omitted;
FIGURE 4 is an elevation of a detail;
FIGURES 5 and 6 are sectional elevations of details; and
FIGURE 7 is a circuit diagram.

The coffee beans to be roasted are put into a cylindrical, boro-silicon glass bottle 1 closed at one end and having an open coaxial neck 2 at the other end. The coffee beans are put into and tipped out of the bottle 1 through the neck 2, and sample beans may be withdrawn through the neck 2 by means of a spoon while the roasting is in progress.

The roasting is effected while the bottle is horizontal and rotated about its longitudinal axis at a speed of fifty-six revolutions per minute. For this purpose the bottle is mounted partly in a base 3 with the neck 2 resting on a pair of freely rotatable supporting rollers 4, and a coaxial protuberance 5, formed coaxially at the closed end of the bottle, rests on a freely rotatable supporting roller 6 while a ring of gear teeth 7, mounted round the protuberance 5, is in mesh with a gear 8 driven by an electric motor 26, FIGURE 7, contained in an enclosed portion 9 of the base. The ring of gear teeth 7 may be of glass and formed integrally with the bottle 1, or they may be formed on a separate ring fixed round the protuberance 5.

The base 3 has two side walls 10, 10a extending, on opposite sides of the bottle from the enclosed portion 9, to an end wall 11 having in its upper edge a notch 12 which leaves the entrance to the neck fully exposed. The rollers 4 are mounted on pins 13 carried by the end wall 11 and retained thereon by circlips 14. The roller 6 (FIGURE 3) is similarly mounted on a pin 6a projecting from the enclosed portion 9.

The end wall 11 and the enclosed portion 9 are formed near the bottom of the base 3 respectively with arcuate flanges 16, 17 between which extends the heating unit 18 for roasting the coffee. The base 3 is formed with small feet 19 that provide adequate clearance between the heating unit 18 and the surface on which the base stands.

The heating unit 18 includes an arcuate metal plate 20 which extends between the flanges 18, 19 and is secured thereto by screws 21. The plate 20 carries flanges 22 which support a sinuous heating element 23. This heating element 23 is of the kind used in electric cookers and delivers two kilowatts. It consists of an electrical conductor contained in a refractory coating. One of the outermost limbs of the heating element is, as shown in FIGURE 1, extended by a transverse limb 24 which meets the other outermost limb of the heating element at a location 25, where the two extremities of the heating element 23 pass into the enclosed portion 9 of the base. These extremities may be connected (FIGURE 7) to A.C. supply mains, and the motor 26, which drives the gear 8 through reduction gearing, is connected in parallel with the heating element 23. Both the motor 26 and the heating element 23 are controlled by an on-off switch 27 and the heat delivered by the heating element is controlled by a rheostat 28 operated by a knob 29. A safety switch, operated in the event of the heating element becoming too hot, may be provided.

Referring to FIGURE 3, it will be seen that there is a gap between the plate 20 and the side wall 10a, providing for adequate convection of air beneath the bottle 1. On the opposite side, the arcs on which the plate 20 and heating element 23 lie extend nearly to the side wall 10. It is towards this side that the bottle 1, as viewed in FIGURE 3, rotates so that the coffee beans substantially cover the arc embraced by the heating element 23. Thus, the arcuate plane of the heating element is displaced somewhat about the axis of the bottle, in the direction of rotation of the bottle, from a central position.

A bent stainless steel or copper plated wire 30 is sprung inside the bottle 1 so as to rotate therewith and agitate the coffee beans while they are being roasted. This wire may be supplemented by or replaced by ribs cast integrally inside the bottle parallel with its axis. There may be three such ribs equidistantly spaced round the bottle.

In order to enable the bottle 1 to be handled easily, particularly when hot, a heat insulating handle, relatively to which the bottle can rotate, is permanently mounted on the bottle. This handle consists of three portions, a central hand grip portion 31 and two end portions 32, 33 secured to the central portion 31 by screws 34, the heads of which are protected by flanges 35. The end portion 32 has a bifurcated lower extremity, the arms of which terminate in small abutments 36 arranged to engage the neck 2 just below the horizontal diametral plane thereof. The lower extremity of the other end portion 33 is formed with an arcuate surface 37 terminating at flat horizontal surfaces 38 that rest on top of the enclosed portion 9 and prevent the handle from toppling over during the roasting operation. This arcuate surface 37 overlaps the protuberance 5 and is formed with an arcuate finger 39 which is formed with an abutment 40 that co-operates with the arcuate surface 37 in lifting the protuberance 5 when the handle is lifted, while the abutments 36 lift the neck 2. The end portion 33 is also formed with a flange 41 that shields the top of the ring of gear teeth 7.

In a modification of the base, the vertical distance between the horizontal plane containing the tops of the feet 19 and the horizontal plane containing the bottom of the plate 20 is extended to provide for a drawer arranged to be pulled out laterally from the base 3. This drawer contains a metal grid that is raised a little way above the bottom of the drawer. Thus, the drawer may be opened and the roasted beans spread on the grid to cool and the beans then rolled on the grid to separate the light, husky flakes.

In the illustrated example, the bottle is six and a half inches in outside diameter and is designed for roasting one pound of coffee at a time.

I claim:

1. Apparatus for heating liquid, powdered and granular material including in combination, a transparent bottle open substantially coaxially at one end and closed at its opposite end, rotatable means providing a bed for supporting said bottle in a substantially horizontal position and for rotating said bottle about its axis, a projection on the closed end of the bottle carrying drive means engaged by said rotatable means, a base supporting said rotatable means, means, relatively to which said bottle rotates, for heating the contents of said bottle, and a stirring device inside said bottle for stirring the contents by virtue of the rotation of said bottle.

2. Apparatus for heating liquid, powdered and granular material including, in combination, a transparent bottle of heat resistant glass and of circular cross-section, said bottle having an open end and a closed end, rollers and a rotary member for supporting said bottle in a substantially horizontal position with the axis of said bottle above the axes of said rollers and of said rotary member, means at the closed end of the bottle for driving said rotary member so as to rotate said bottle about its axis, means, relatively to which said bottle rotates, for heating the peripheral wall of said bottle, and a base supporting said rollers, said rotary member, said driving means, and said heating means.

3. Apparatus according to claim 2, wherein said rotary member is a spur gear and wherein a ring of gear teeth, in mesh with said spur gear, are mounted on a projection on the closed end of said bottle.

4. Apparatus for heating liquid, powdered and granular material including, in combination a transparent bottle of heat resistant glass, rotatable means providing a bed for supporting said bottle in a substantially horizontal position and for rotating said bottle about its axis, a base supporting said rotatable means, and a sinuous electrical heating element mounted on said base, beneath said bottle, and shaped so as to lie in an arcuate plane coaxial with said bottle but displaced somewhat about the axis of said bottle, in the direction of rotation of said bottle, from a central position.

5. Apparatus for heating liquid, powdered and granular material including, in combination, a transparent bottle of heat resistant glass, rotatable means providing a bed for supporting said bottle in a substantially horizontal position and for rotating said bottle about its axis, a base for supporting said rotatable means, means on said base for heating the contents of said bottle, and a heat insulating handle for applying said bottle to and removing said bottle from said bed, said handle being adapted to rest on said base, out of contact with said bottle, when said bottle is being rotated, and to engage said bottle on being raised from said base.

6. Apparatus for heating liquid, powdered and granular material including, in combination, a bottle formed with a coaxial open neck at one end and with a coaxial circular protuberance at the other end, rotatable means engaging said neck and protuberance for supporting said bottle in a substantially horizontal position and for rotating said bottle about its axis, a base for supporting said rotatable means, means on said base for heating the contents of said bottle, and a heat insulating handle, formed with arcuate surfaces for engaging said neck and said protuberance, for applying said bottle to and removing said bottle from said bed, said handle being adapted to rest on said base, with said arcuate surfaces out of contact with said neck and said protuberance, when said bottle is being rotated, and being adapted to engage said neck and said protuberance on being raised from said base.

7. Apparatus for heating liquid, powdered or granular material including, in combination, a transparent bottle of heat resistant glass and of circular cross section, said bottle being formed with a co-axial open neck at one end and with a co-axial protuberance at its other end, said protuberance being provided with a ring of gear teeth, rotatable means providing a bed on which said bottle rests in a substantially horizontal position, said rotatable means comprising two rollers for supporting said neck, and a third roller and a spur gear in mesh with said gear teeth for supporting said protuberance, driving means for rotating the spur gear, means for heating the contents of the bottle, a base for supporting the rollers, said spur gear, said driving means and the heating means, said base including two end portions joined by two side walls on opposite sides of the bottle, said heating means being an electrical heating element mounted between said side walls and beneath said bottle, said two rollers being mounted on one end portion, and said third roller, said spur gear and said driving means being mounted on the other end portion.

8. Apparatus for heating liquid, powdered or granular material including, in combination, a transparent bottle of heat resistant glass having an open neck at one end and means at its other end by which the bottle is rotated, a base on which the bottle is rotatively mounted, a handle adapted to rest upright upon the base, said handle having a forked lower end straddling the bottle, said handle remaining stationary while the bottle is rotated relatively to its forked end, said forked lower end being effective to engage the bottle in a manner to cause it to lift the bottle from off the base when said handle is manually raised.

References Cited in the file of this patent

UNITED STATES PATENTS

| | | |
|---|---|---|
| 2,006,050 | Rudorff | June 25, 1935 |
| 2,041,318 | Berger | May 19, 1936 |
| 2,159,027 | Jalma et al. | May 23, 1939 |
| 2,189,206 | Grifin | Feb. 6, 1940 |
| 2,543,297 | Olmsted | Feb. 27, 1951 |